(12) United States Patent
Stolze et al.

(10) Patent No.: US 11,954,119 B2
(45) Date of Patent: Apr. 9, 2024

(54) APPLYING CHANGES IN A TARGET DATABASE SYSTEM

(71) Applicant: International Business Machines Corporation, Armonk, NY (US)

(72) Inventors: Knut Stolze, Hummelshain (DE); Felix Beier, Haigerloch (DE); Reinhold Geiselhart, Rottenburg-Ergenzingen (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 17/148,644

(22) Filed: Jan. 14, 2021

(65) Prior Publication Data

US 2022/0222271 A1 Jul. 14, 2022

(51) Int. Cl.
*G06F 16/27* (2019.01)
*G06F 16/22* (2019.01)
*G06F 16/23* (2019.01)

(52) U.S. Cl.
CPC .......... *G06F 16/27* (2019.01); *G06F 16/2282* (2019.01); *G06F 16/23* (2019.01)

(58) Field of Classification Search
None
See application file for complete search history.

(56) References Cited

U.S. PATENT DOCUMENTS

| 7,853,561 B2 | 12/2010 | Holenstein |
| 7,979,652 B1 * | 7/2011 | Sivasubramanian ........................ G06F 11/2094 711/141 |
| 9,128,628 B1 | 9/2015 | Natanzon |

(Continued)

FOREIGN PATENT DOCUMENTS

| CN | 107025242 A | 8/2017 | |
| CN | 109997125 A | 7/2019 | |
| CN | 110795508 A * | 2/2020 | ............. G06F 16/27 |

OTHER PUBLICATIONS

IBM, "ST_Generalize function", IBM Knowledge Center, Accessed on Dec. 22, 2020, 4 Pages.

(Continued)

*Primary Examiner* — Kris E Mackes
*Assistant Examiner* — Cao D Vuong
(74) *Attorney, Agent, or Firm* — Stephanie L. Carusillo

(57) ABSTRACT

In an approach for dynamically selecting the application algorithm to be used for each change in a target database system, a processor provides at least two application algorithms for applying changes to a table in a target database system. A processor determines, for each application algorithm of the at least two application algorithms, a performance behavior of each application algorithm for sizes of changes that are applied to the table by the respective application algorithm. A processor receives a data change request for applying a change to the table. A processor determines a size of the change to the table. A processor (Continued)

selects one of the at least two application algorithms that provides a best performance for the size based on the performance behavior of each application algorithm. A processor applies the change to the table using the selected application algorithm that provides the best performance for the size.

16 Claims, 7 Drawing Sheets

(56) References Cited

U.S. PATENT DOCUMENTS

| | | | |
|---|---|---|---|
| 9,507,844 B2 | 11/2016 | Blea | |
| 9,716,754 B2 | 7/2017 | Swift | |
| 11,354,665 B1* | 6/2022 | Avetisov | G06Q 20/40145 |
| 2007/0185920 A1* | 8/2007 | Castro | G06F 16/273 |
| 2008/0082592 A1* | 4/2008 | Ahal | G06F 11/2074 |
| 2009/0037422 A1* | 2/2009 | Wong | G06F 16/27 |
| 2010/0030730 A1* | 2/2010 | Shang | G06F 16/27 |
| | | | 707/637 |
| 2011/0252124 A1* | 10/2011 | Bonner | H04L 67/1095 |
| | | | 709/224 |
| 2012/0278282 A1* | 11/2012 | Lu | G06F 16/273 |
| | | | 707/634 |
| 2016/0077917 A1* | 3/2016 | Battepati | G06F 11/2082 |
| | | | 714/15 |
| 2017/0017680 A1* | 1/2017 | Jaakola | G06F 16/2379 |
| 2020/0057752 A1* | 2/2020 | Tofano | G06F 9/54 |
| 2020/0364240 A1 | 11/2020 | Martin | |

OTHER PUBLICATIONS

Mansouri, Najme, "A Threshold-based Dynamic Data Replication and Parallel Job Scheduling strategy to enhance Data Grid", Cluster Computing, © Springer Science+Business, Oct. 9, 2013, 21 Pages.

Sun et al., "Modeling a Dynamic Data Replication Strategy to Increase System Availability in Cloud Computing Environments", Journal of Computer Science and Technology, vol. 27, Issue (2), 256-272, Mar. 2012, 17 Pages.

Vashisht et al., "Agent Based Optimized Replica Management in Data Grids", Revista Investigacion Operacional, vol. 41, No. 2, 232-248, May 2020, 17 Pages.

"Patent Cooperation Treaty PCT International Search Report", Applicant's File Reference: IEE210964PCT, International Application No. PCT/CN2022/071056, International Filing Date: Jan. 10, 2022, dated Apr. 7, 2022, 9 pages.

* cited by examiner

APPLYING CHANGES IN A TARGET DATABASE SYSTEM

BACKGROUND

The present invention relates to the field of database systems, and more specifically, to providing a method for dynamically selecting the application algorithm to be used f for applying a change in a target database system.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for moving data from one system to another. However, these approaches may need further improvement.

SUMMARY

Aspects of an embodiment of the present invention disclose a computer-implemented method, computer program product, and computer system for dynamically selecting the application algorithm to be used for applying a change in a target database system. Embodiments of the present invention can be freely combined with each other if they are not mutually exclusive.

A processor provides multiple application algorithms for applying changes in a target database system. A processor determines, for each application algorithm of the provided application algorithms, a performance behavior of the application algorithm for different sizes of changes that are applied to a table of the target database system by the application algorithm. A processor receives a data change request for applying a change to the table. A processor determines a size of the requested change to the table. A processor uses the determined performance behaviors for selecting one of the application algorithms that provides a best performance for the determined size. A processor applies the requested change to the table using the selected application algorithm.

DETAILED DESCRIPTION

Figure 1:
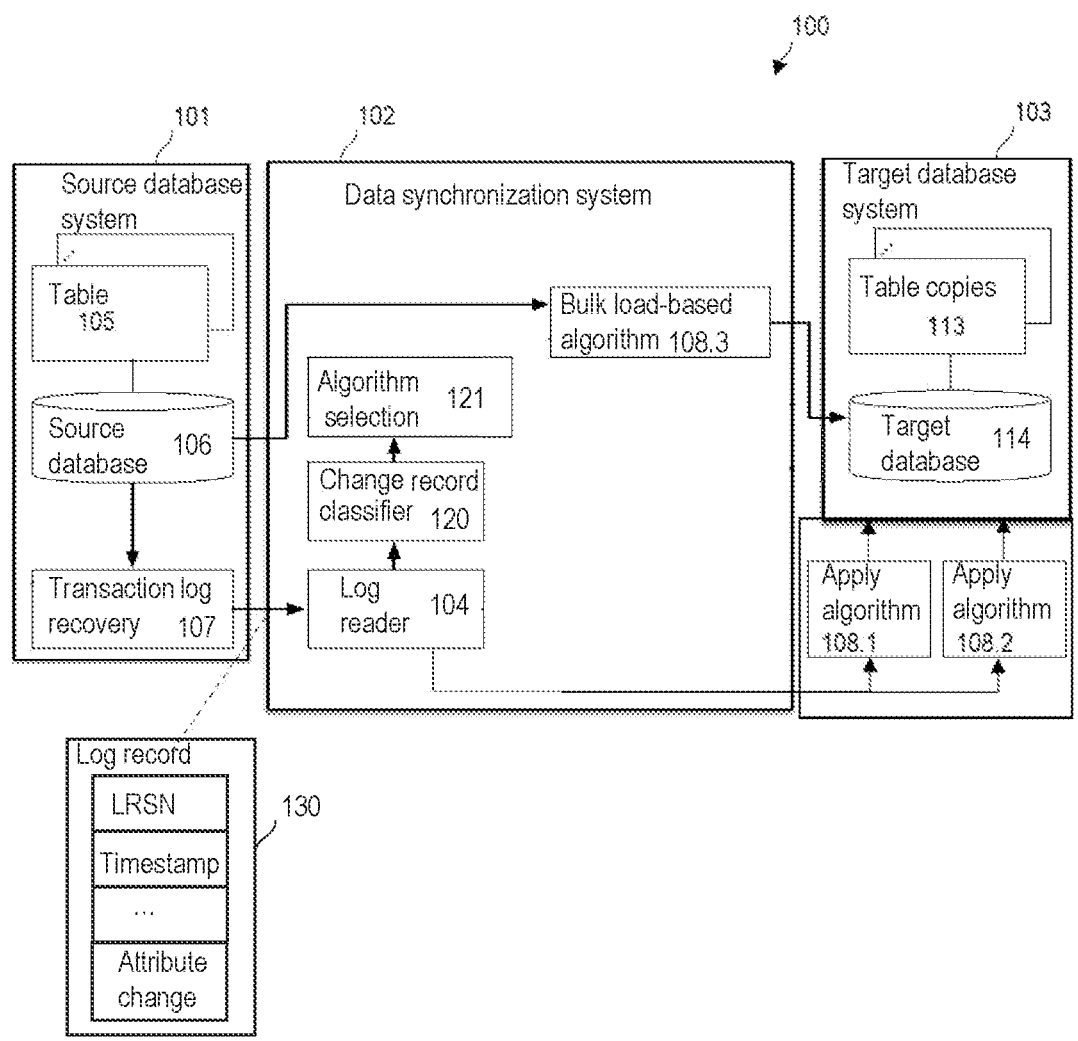
FIG. 1 depicts a data processing system in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The target database system may be part of a data analysis system. The data analysis system comprises a target database system and a source database system. The data analysis system may, for example, be a data warehousing system or a master data management system. The data analysis system may enable data warehousing, master data management, or another technique that uses source and target database systems, wherein the target database system comprises a target database that is configured to receive/comprise a copy of a content of a corresponding source database of the source database system. The source database system may be connected to the target database system via a connection. The connection may, for example, be a TCP/IP connection or another connection enabling the communication of data via the connection between the source database system and the target database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format, i.e., the target dataset may be stored by column rather than by row. The content of the source dataset may be changed by one or more database transactions.

The data analysis system may be configured to replicate changes that occur in a source table of the source database system to the target database system so that said changes may be applied on a target table of the target database system that corresponds to the source table. Applying a change may, for example, comprise inserting one or more records, updating one or more records, and/or deleting one or more records in one or more tables of the target database system. A data record or record of a table is a collection of related data items such as a name, date of birth, and class of a particular user. A record represents an entity, wherein an entity refers to a user, object, or concept about which information is stored in the record. For that, multiple application algorithms (which may also be referred to as update strategies) may be provided, wherein each application algorithm specifies a sequence of replication operations to be performed in order to apply changes to the target database system. The application algorithms may, for example, comprise an incremental load-based algorithm and a bulk-load based algorithm. The incremental load-based algorithm may, for example, require that each recorded change of a log record is applied individually in the target database system. The incremental load-based algorithm may particularly be advantageous for small data sets because the overhead for large chunks may be high. The bulk load-based application algorithm may, for example, require that the recorded changes of log records are staged into batches. Those batches may then be applied via a bulk load interface to the target database system. The bulk load-based application algorithm may advantageously be used for large datasets. However, the overhead to setup the bulk load may be too high and should not be spent for small-sized chunks that are comprised of just a few rows.

Hence, depending on the change to be applied on the target database system, the application algorithms may have different performances. However, choosing the suitable algorithm accurately and in a systematic way may not be a straightforward action. The present invention may solve this issue by providing an optimal and efficient method for dynamically selecting the application algorithm to be used for each change. The method may be efficient in time as it may save additional time that would otherwise be required by a non-adequate application algorithm. The method may be optimal because the decisions may be based on performance behaviors that are accurate and up to date.

The performance behavior of each application algorithm may, for example, be represented by a data structure. The data structure may comprise data points $p_1, p_2 \ldots p_N$ ($N \geq 2$), wherein each data point $p_i$ ($i=1, \ldots N$) comprises a change size $s_i$ value and m ($m \geq 1$) performance parameters values $l_1^i \ldots l_m^i$. The number N may reflect the number of changes. In one example, the number N may be time-based, e.g., the number N may be the number of changes caused by all operations in the last two hours. For example, data point $p_1$ may be defined as $p_1=(s_1, l_1^1 \ldots l_m^1)$, data point $p_2$ may be defined as $p_2=(s_2, l_1^2, \ldots l_m^2)$, etc. If, for example, the number of performance parameters is one, i.e., m=1, the data structure may be a two-dimensional structure. The data points of the two-dimensional structure may define a two-dimensional space which may, for example, be represented by a curve of two axes, one associated with the size of changes and the other axis associated with the values of the performance parameter. If, for example, the number of performance parameters is two, i.e., m=2, the data structure may be a three-dimensional structure. The data points of the three-dimensional structure may define a three-dimensional space which may, for example, be represented by a cube of three axes, one associated with the size of changes and the two other axes are associated with the values of the performance parameters respectively. Thus, the data points of the data structure may define a (m+1)-dimensional space. Upon receiving a new request to apply a change in the target database system, the size $s_t$ of the requested change may, for example, be used to find, in the (m+1)-dimensional space, the distinct closest points and to select the application algorithm associated with one of those closest points that provides the best performance for that size $s_t$. Distinct closest points mean that each closest point is associated with a respective distinct application algorithm program. The values of the performance parameter may, for example, depend on the number of columns, data types of the columns, hardware configuration such as CPU speed, type of memory, size of CPU caches, etc.

According to one embodiment, the method further comprises evaluating a performance of the selected application algorithm by application of the requested change and updating the performance behavior of the selected application algorithm using the evaluated performance and the determined size. For example, the m performance parameters may be evaluated for this requested change having size $s_t$. This may result in a new point $p_t=(s_t, l_1^t \ldots l_m^t)$ in the data structure associated with the selected application algorithm. This embodiment may be advantageous as it dynamically updates the performance behaviors of the selected application algorithms. This may enable a self-tuning system.

According to one embodiment, the method further comprises repeating the step of determining the size, the step of selecting the application algorithm, and the step of applying the change for each received data change request of the table. This may enable to dynamically update the performance behaviors of the table.

According to one embodiment, the method further comprises: performing the determining of the performance behaviors step for each further table of the target database system, resulting in each table of the target database system being associated with respective performance behaviors; and repeating the step of determining the size, the step of selecting the application algorithm, and the step of applying the change for each received data change request of a specific table of the target database system using the performance behaviors associated with said specific table. This embodiment may be advantageous because it makes the performance behaviors of the application algorithms also dependent on the tables. This may particularly be advantageous because the same application algorithm may be the most efficient algorithm for a given size of the change of a given table having few columns, but it may be the less efficient for the same change size for another table that has much more columns or the columns may have different data types.

According to one embodiment, determining the performance behavior of the application algorithm comprises: executing the application algorithm a predefined number N of times for applying data changes to the table respectively, wherein each applied data change has a size; evaluating, for each data change of the data changes, at least one performance parameter indicative of a performance of the execution of the application algorithm; and providing a data structure of N data points representing the performance behavior, wherein each data point is indicative of the evaluated performance parameter and associated size of the data change. This embodiment may be advantageous because at the initial setup of the data analysis system there may be no measurements available yet. This embodiment may enable an initial execution of the application algorithm that provides the initial measurements that may be refined later on. In one example, the initial execution of the application algorithm may be a dummy execution with dummy data, e.g., 1000 rows may be inserted into the table and the execution time may be measured. The changes for those 1000 rows may be rolled back without being committed. In another example, the execution of the application algorithm may be caused by N received change requests. The application algorithm may be selected among the predefined algorithms randomly or via round-robin or some other scheme. That is done until sufficient measurement N points are available.

According to one embodiment, the number N is smaller than a configurable maximum number of executions (e.g., 3). The method further comprises constructing new data points in the data structure by using interpolation of the N data points. For example, 2 (i.e., N=2) INSERTs may be performed with each of the application algorithms for inserting a number of rows. The numbers of rows of the two INSERTs may be different and have a greater variety, e.g., 100 rows and 700 rows (e.g., but not 100 rows and 101 rows). The performance parameter(s) may be evaluated for each of the two INSERTs. This defines the first baseline, e.g., in form of a linear curve on which extrapolation can be applied subsequently. Splines may be used to approximate the curve or simple linear interpolation.

According to one embodiment, the performance parameter is any one of execution time and memory usage.

According to one embodiment, the size of the change comprises a number of records to be inserted, number of records to be deleted, and/or number of records to be updated.

According to one embodiment, selecting the application algorithm comprises determining whether the performance of two application algorithms for the determined size are similar and selecting any one of the two application algorithms if they are similar. Two application algorithms may have similar performances at cross points of their performance behaviors. Those cross points may have a very important characteristic: the cross points are the break-even points in terms of performance. The performance for processing "n" rows with algorithm A or algorithm B is identical. That means, it does not matter which of the algorithms is chosen. Deviating slightly from the cross points does not yield significant "jumps" in the performance curve. For example, if algorithm A is better for less than 1000 rows and algorithm B is better for more than 1000 rows, choosing B for 990 rows is still very close to algorithm A. This may have the extremely helpful implication of a smooth transition when switching from algorithm A to algorithm B.

According to one embodiment, the application algorithm is any one of a record bulk load-based application and an individual record load-based application.

According to one embodiment, the method further comprises providing a source table associated with the table in a source database system, wherein the source and target database systems are configured to synchronize data between each other; and wherein the data change request is received in response to said data change being applied to the source table, thereby replicating the data change.

Implementation of embodiments of the invention may take a variety of forms, and exemplary implementation details are discussed subsequently with reference to the Figures.

FIG. 1 is a block diagram of a data processing system (or data analysis system) 100 in accordance with an embodiment of the present invention. The data processing system 100 may be configured for data synchronization between a source database system 101 and target database system 103 using data synchronization system 102 in accordance with an embodiment of the present invention. The source database system 101 may, for example, be an online transaction processing (OLTP) system. The target database system 103 may, for example, be an online analytical processing (OLAP) system. The communication between the source database system 101 and the target database system 103 may, for example, be performed via a TCP/IP communication layer.

The source database system 101 comprises one or more source tables 105 of a source database 106 and a transaction recovery log 107. The entries or log records of the transaction recovery log 107 describe changes to rows or records of the source tables 105 at the source database system 101. FIG. 1 shows an example content of a log record 130. The log record 130 may comprise a timestamp, LRSN, and attribute changes. More specifically, the log records in the transaction recovery log 107 may, for example, contain information defining (1) the table being changed, (2) the value of the key column in the row being changed, (3) the old and new values of all columns of the changed row, and (4) the transaction (unit of work) causing the change. By definition, an insert is a new data record and, therefore, has no old values. For delete changes, there is by definition no new data record, only an old data record. Thus, transaction log records for inserted rows may contain only new column values while transaction log records for deleted rows may contain only old column values. Transaction log records for updated rows may contain the new and old values of all row columns. The order of log records in the transaction recovery log may reflect the order of change operations of the transactions and the order of transaction commit records may reflect the order in which transactions are completed. The type of row operations in transaction log records can, for example, be delete, insert, or update.

The data synchronization system 102 comprises a log reader 104. Although shown as part of the data synchronization system 102, the log reader 104 may, in another example, be part of the source database system 101. The log reader 104 may read log records of the transaction recovery log 107 and provide them to a change record classifier 120. The change record classifier 120 may classify the log records based on their changes (e.g., to determine the size of the changes) so that an algorithm selection module 121 may select one of application algorithms 108.1-108.3 based on the classification of the log records and the update may be performed based on the selected application algorithm. The application algorithm selection and the change application using said application algorithm may, for example, be performed on a periodic basis, e.g., every hour, or may be performed automatically as soon as a pre-defined amount of log records (e.g., 1000 log records) is saved in the transaction recovery log 107, e.g., that amount of log records may be used to define a new change request. In each iteration, only the newly added log records with respect to the previous provided log records may be processed. The selected application algorithm may, for example, comprise a bulk load-based update strategy or one or more incremental update strategies, corresponding to bulk-load based algorithm 108.3 and incremental algorithms 108.1 and 108.2, respectively. The synchronization may be performed differently for the bulk load-based update strategy and the incremental update strategy.

The log reader 104 may be configured to perform a log shipping of the transaction recovery log 107 to the target database system 103 based on an incremental update algorithm that is selected by the selection module 121. The shipping may, for example, be performed by sending a stream of log records formed from log records of the transaction recovery log 107. The log stream being shipped may, for example, be associated with a stream ID. The stream of log records may, for example, be a stream of merged log records. This may enable an efficient processing of the log records at the target database system 103. The target database system 103 may comprise multiple algorithms 108.1 and 108.2 each being associated with a respective incremental update strategy. FIG. 1 shows only three algorithms for example purposes, but it is not limited to these types or number of algorithms. The target database system 103 further comprises one or more target table copies 113. The target database system comprises a log streaming interface for receiving the log streams from the source database system 101. Each of the algorithms 108.1 and 108.2 may be configured to receive streams of log records via the log streaming interface. Each of the algorithms 108.1 and 108.2 may buffer the received log records and consolidate the changes into batches to improve efficiency when applying the modifications to the table copies 113 of the target database 114, e.g., via a bulk load interface.

In another example, a bulk load-based (snapshot updates) algorithm 108.3 may be performed between the source database system 101 and the target database system 103 based on a selected bulk load-based update strategy. The load may be a load of entire table data or of a set of partitions of a table at a given point in time and directly performed from the source database system 101 to the target database system 103. Data on the target database system 103 may reflect the source database system state at the time the load was executed.

Although shown as separate components, the data synchronization system 102 may, in another example, be part of the source database system 101 or be part of the target database system 103. In one example, the source and target database systems 101 and 103, respectively, may be on the same system or on different systems in a distributed network.

Figure 2:
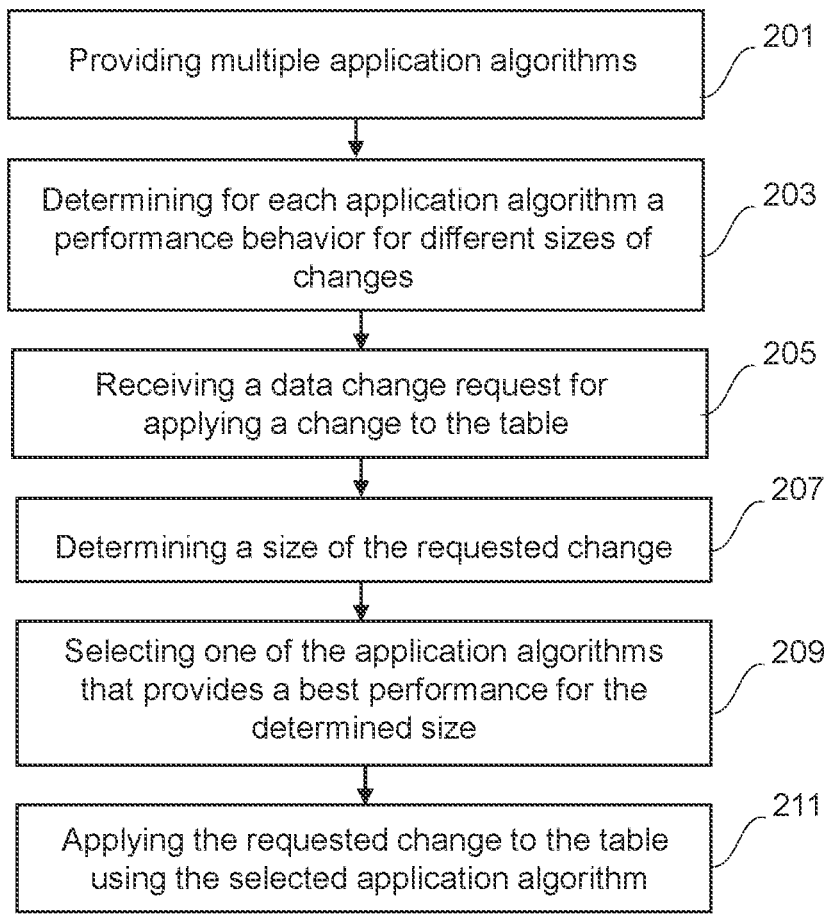
FIG. 2 is a flowchart of a method for applying changes in a target database system in accordance with an embodiment of the present invention.

FIG. 2 is a flowchart of a method for applying changes into a table $T_g$ of a target database system in accordance with an embodiment of the present invention. For the purpose of explanation, the method described in FIG. 2 may be implemented in the system illustrated in FIG. 1 but is not limited to this implementation. The method of FIG. 2 may, for example, be performed by the data synchronization system 102. The method of FIG. 2 may, for example, enable to apply changes made in a source table $T_s$ (that corresponds to $T_g$) of a source database system to the target database system and thus may enable synchronization between the source and target database systems.

Multiple application algorithms may be provided in step 201 for applying changes in the target database system. For example, a number r of application algorithms $App_1, \ldots App_r$, where r≥2. The application algorithms may, for example, comprise a single record apply algorithm and a bulk load apply algorithm. The single record apply algorithm may apply each change recorded in each log record individually. Each of the algorithms may apply changes in different ways, resulting effectively in other application algorithms. For example, the single record apply algorithm may update only data changed since the last update of the table $T_g$ or may update the whole table $T_g$ whenever a change occurred at the corresponding source table $T_s$. This may provide two different single record apply algorithms.

A performance behavior of each application algorithm of the application algorithms $App_1, \ldots App_r$ may be determined in step 203. The performance behavior may indicate how the performance of the application algorithm varies as a function of sizes of changes that are applied to the table $T_g$ by the application algorithm. For that, a number N of changes may be applied to the table $T_g$ using each of the application algorithms $App_1, \ldots App_r$. Each of the N changes may have its own size. The size may, for example, be the number of records to be inserted in the table $T_g$ and/or the number of records to be deleted from the table $T_g$. For each applied change, the m performance parameters may be evaluated for each of the application programs $App_1, \ldots App_r$. This may result in r data structures (e.g., curves of discrete points $curv_1, \ldots curv_r$). Each of the r data structures comprises N data points $p_1=(s_1, l_1^1 \ldots l_m^1), p_2=(s_2, l_1^2 \ldots l_m^2) \ldots p_N=(s_N, l_1^N \ldots l_m^N)$ representing the N change sizes $s_1 \ldots s_N$ in association with respective measured values of the m performance parameters. For example, if the number m of performance parameters is one, each of the data points may be a pair of values comprising the size of the change and the corresponding performance parameter value. The performance parameters may, for example, be the execution time and memory usage.

Step 203 may, for example, be performed as part of a pre-processing step, e.g., offline before the table $T_g$ is used at run time of the data analysis system. In another example, step 203 may be performed at run time of the data analysis system. The number N of changes may be chosen as small as possible, e.g., N=2, because step 203 may be resource consuming as it evaluates every application algorithm for each of the N changes.

However, if the number N of changes is not enough to estimate performances of requested changes, the resulting data structures $curv_1, \ldots curv_r$ may further be enhanced by adding additional points to them. This addition of additional points may be performed using, for example, interpolation. The interpolation may, for example, be linear or spline interpolation. Thus, each of the data structures $curv_1, \ldots curv_r$ may have N+x data points. In another example, the data structures $curv_1, \ldots curv_r$ may be processed in order to model their behavior using mathematical functions. Hence, step 203 may result in r data structures with discrete points or in r mathematical functions representing the performance behaviors of the application algorithms $App_1, \ldots App_r$, respectively.

A data change request may be received in step 205 for applying a change to the table $T_g$. For example, in response to detecting a change in the source table $T_s$, the data change request may be sent to a data synchronization system, e.g., data synchronization system 102 of FIG. 1.

In response to receiving the data change request, the size of the requested change may be determined in step 207. The definition of the size may be the same used for determining the performance behaviors. For example, the size $s_t$ of the requested data change may be the number of records to be inserted and/or the number of records to be deleted from the table $T_g$.

The determined size $s_t$ may be used to select, in step 209, the application algorithm that provides the best performance compared to the other application algorithms for the determined size $s_t$. For that, the performance of each of the application algorithms $App_1, \ldots App_r$ may be estimated for the determined size $s_t$. This estimation may be performed using the data structures $curv_1, \ldots curv_r$ or the mathematical models determined in step 203. For example, in case of using the data structures $curv_1, \ldots curv_r$ with discrete points, the closest point to the determined size $s_t$ of each data structure may be identified. This may result in r closest points. The values of the performance parameters of the closest points may be compared and the best closest point may be selected. The selected closest point may be associated with one of the application algorithms. This one of the application algorithms may be the selected application algorithm of step 209.

In case of using the mathematical models, the determined size $s_t$ may be given as argument or input to each of the mathematical models in order to estimate the performance associated with the size $s_r$. This may result in r sets of values of the performance parameter(s). These may be compared against each other to identify the best performance and associated application algorithm.

The requested change may be applied in step 211 to the table $T_g$ using the selected application algorithm.

Figure 3:
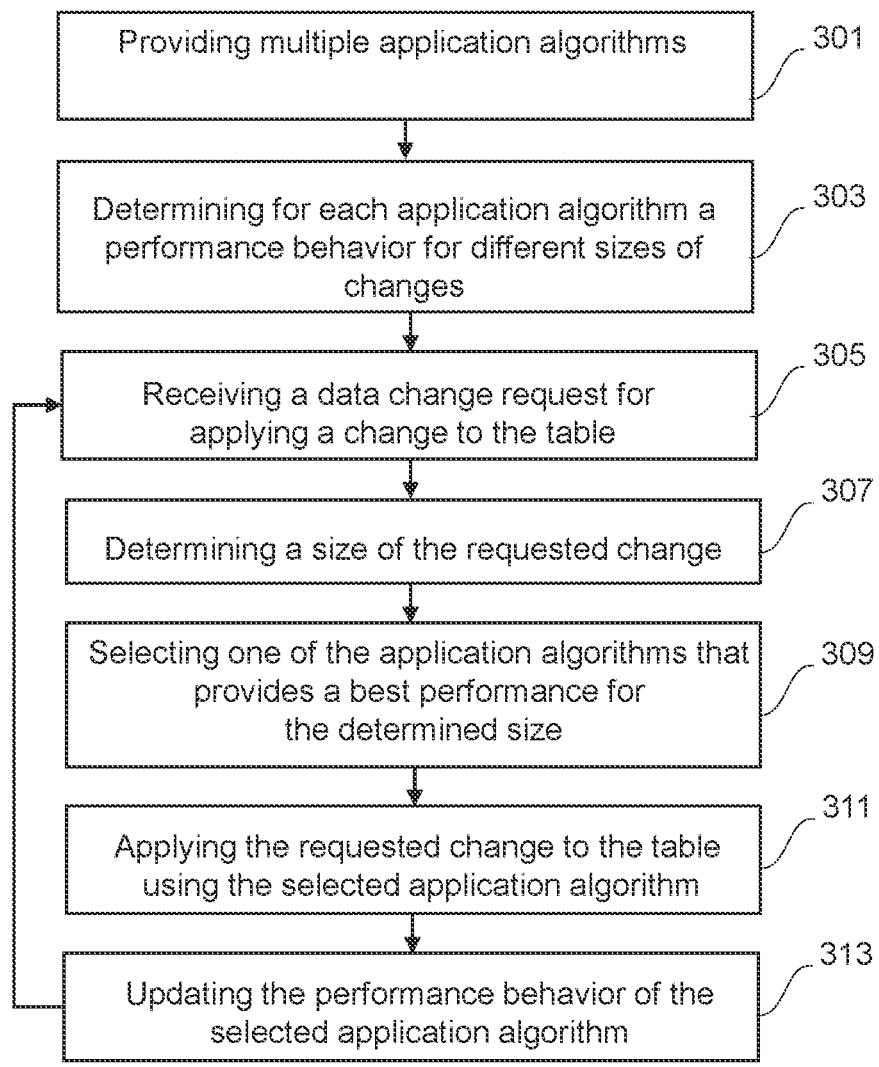
FIG. 3 is a flowchart of a method for applying changes in a target database system in accordance with an embodiment of the present invention.

FIG. 3 is a flowchart of a method for applying changes into a table $T_g$ of a target database system in accordance with an embodiment of the present invention. For the purpose of explanation, the method described in FIG. 3 may be implemented in the system illustrated in FIG. 1 but is not limited to this implementation. The method of FIG. 3 may, for example, be performed by the data synchronization system 102. The method of FIG. 3 may, for example, enable to apply changes made in a source table $T_s$ (that corresponds to $T_g$) of a source database system to the target database system and thus may enable synchronization between the source and target database systems.

Steps 301 to 311 are steps 201 to 211 of FIG. 2. In addition, the method of FIG. 3 further comprises the step 313 of updating the performance behavior determined in step 303 for the selected application algorithm. This may, for example, be performed by adding a point $p_t=(s_t, l_1^t \ldots l_m^t)$ associated with the received change to the data structure representing the performance behavior of the selected application algorithm. Moreover, steps 305 to 313 may be repeated for each data change to be applied to the table $T_g$.

Figure 4:
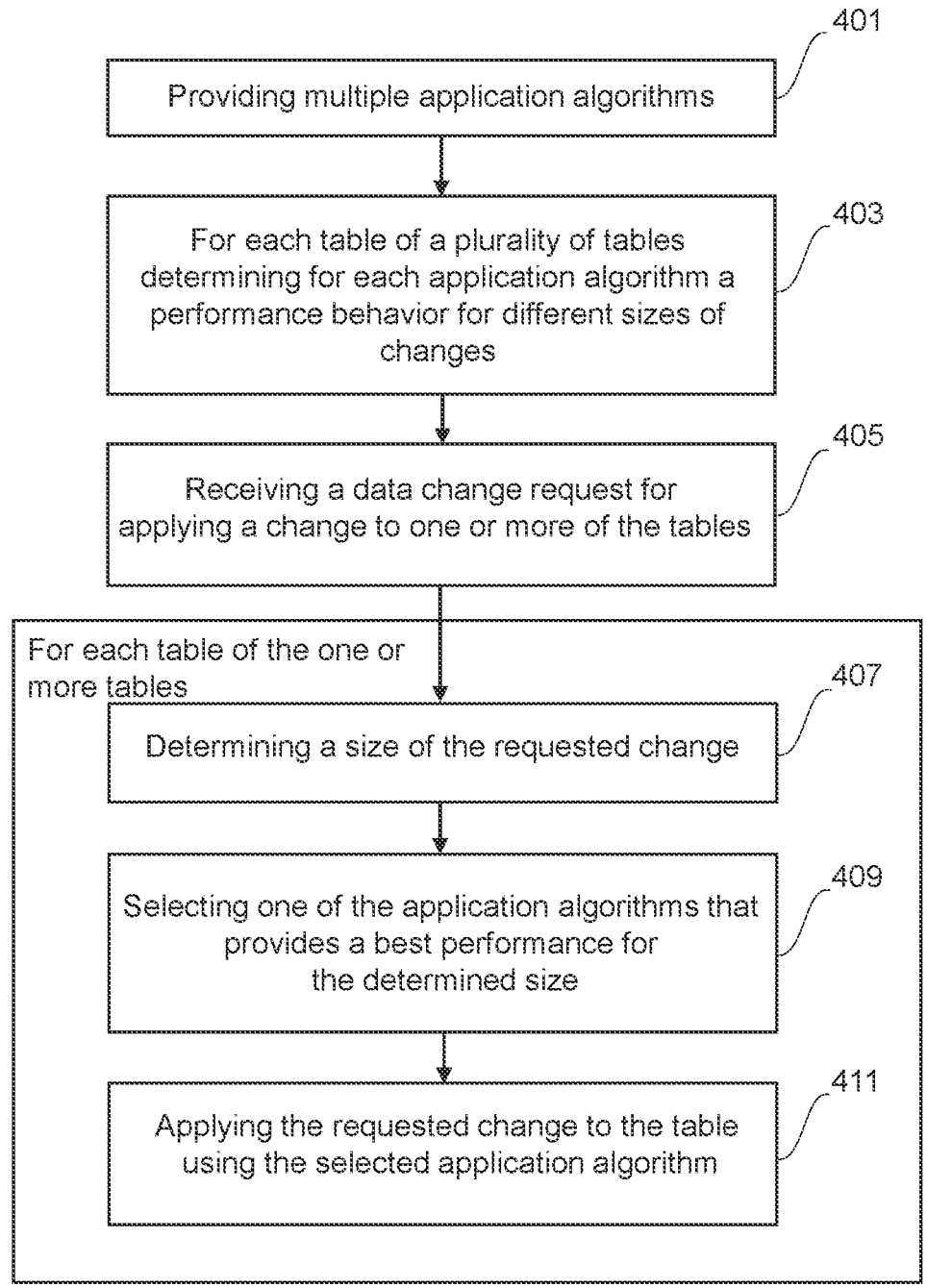
FIG. 4 is a flowchart of a method for applying changes in a target database system in accordance with an embodiment of the present invention.

FIG. 4 is a flowchart of a method for applying changes into a plurality of tables of a target database system in accordance with an embodiment of the present invention. For the purpose of explanation, the method described in FIG. 4 may be implemented in the system illustrated in FIG. 1 but is not limited to this implementation. The method of FIG. 4 may, for example, be performed by the data synchronization system 102. The method of FIG. 4 may, for example, enable to apply changes made in a plurality of source tables (that correspond to the plurality of the target tables) of a source database system to the target database system and thus may enable synchronization between the source and target database systems.

Multiple application algorithms may be provided in step 401 (e.g., as described in step 201) for applying changes in the target database system.

A performance behavior of each application algorithm of the application algorithms $App_1, \ldots App_r$ may be determined in step 403 and for each table of the plurality of tables. For example, step 403 may comprise: performing step 203 of FIG. 2 for each table of the plurality of tables. This may be advantageous because it makes the performance behaviors of the application algorithms also dependent on the tables.

A data change request may be received in step 405 for applying one or more changes to one or more tables respectively. The changes may have different sizes as they are applied to different tables.

For each table of the one or more tables, steps 407 to 411 may be performed applied using the performance behaviors of the table. Steps 407 to 411 are steps 207 to 211 of FIG. 2.

Figure 5:
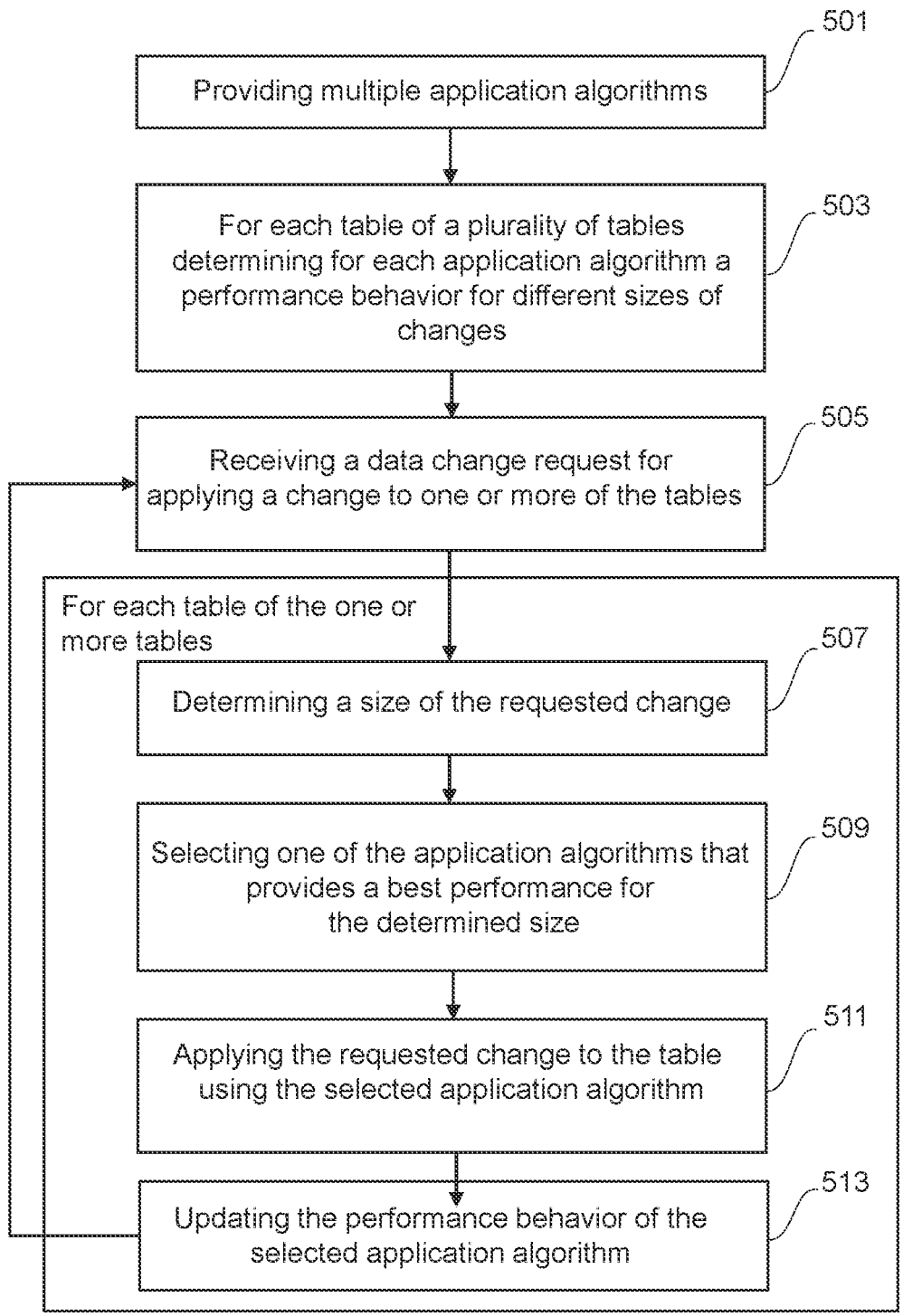
FIG. 5 is a flowchart of a method for applying changes in a target database system in accordance with an embodiment of the present invention.

FIG. 5 is a flowchart of a method for applying changes into a plurality of tables of a target database system in accordance with an embodiment of the present invention. For the purpose of explanation, the method described in FIG. 5 may be implemented in the system illustrated in FIG. 1 but is not limited to this implementation. The method of FIG. 5 may, for example, be performed by the data synchronization system 102. The method of FIG. 5 may, for example, enable to apply changes made in a plurality of source tables (that correspond to the plurality of the target tables) of a source database system to the target database system and thus may enable synchronization between the source and target database systems.

Steps 501 to 511 are steps 401 to 411 of FIG. 4. In addition, the method of FIG. 5 further comprises the step 513 of updating the performance behavior determined in step 503 for the selected application algorithm. Moreover, steps 505 to 513 may be repeated for each change(s) to be applied to one or more tables of the plurality of tables.

Figure 6A:
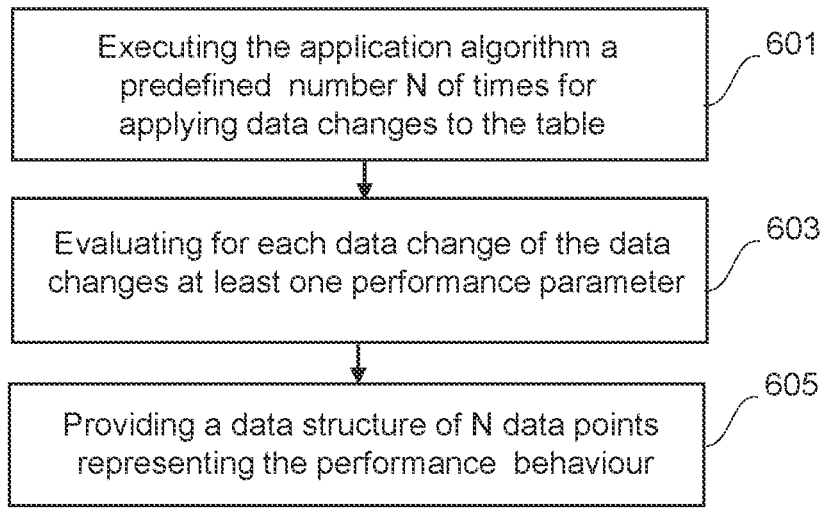
FIG. 6A is a flowchart of a method for determining the performance behavior of an application algorithm in accordance with an embodiment of the present invention.

FIG. 6A is a flowchart of a method for determining the performance behavior of an application algorithm in accordance with an embodiment of the present invention.

The application algorithm may be executed in step 601 a predefined number N of times for applying data changes to the table respectively, wherein each applied data change has a size.

For each data change of the data changes, at least one performance parameter indicative of a performance of the execution of the application algorithm may be evaluated in step 603. For example, the execution time of the application algorithm may be measured for the application of each of the N changes.

A data structure of N data points may be provided in step 605. The data structure represents the performance behavior of the application algorithm. Each data point is indicative of the evaluated performance parameter and associated size of the data change. FIG. 6C shows an example of N=2 measured data points for two application algorithms $App_1$ and $App_2$.

Figure 6B:
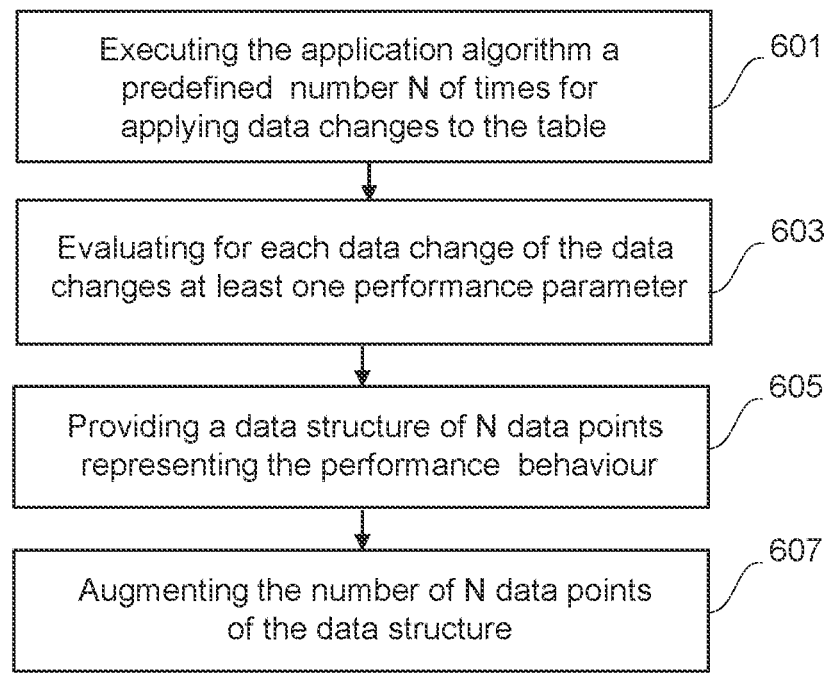
FIG. 6B is a flowchart of a method for determining the performance behavior of an application algorithm in accordance with an embodiment of the present invention.
Figure 6C:
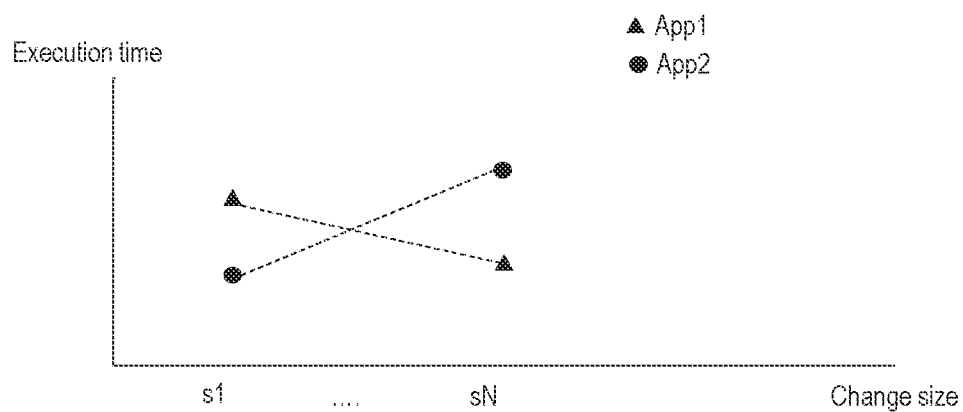
FIG. 6C is a curve illustrating the performance behavior of application algorithms in accordance with an embodiment of the present invention.

FIG. 6B is a flowchart of a method for determining the performance behavior of an application algorithm in accordance with an embodiment of the present invention.

The method of FIG. 6B comprises the above described steps 601 to 605 and step 607. In step 607, the provided data structure representing the performance behavior of the application algorithm may be augmented with additional points. This may, for example, be performed using an interpolation between the N data points. This is, for example, indicated in FIG. 6C where a linear interpolation is performed between the two data points of each of the application algorithms. Additional points may be any points along the dashed lines (interpolations).

Figure 7:
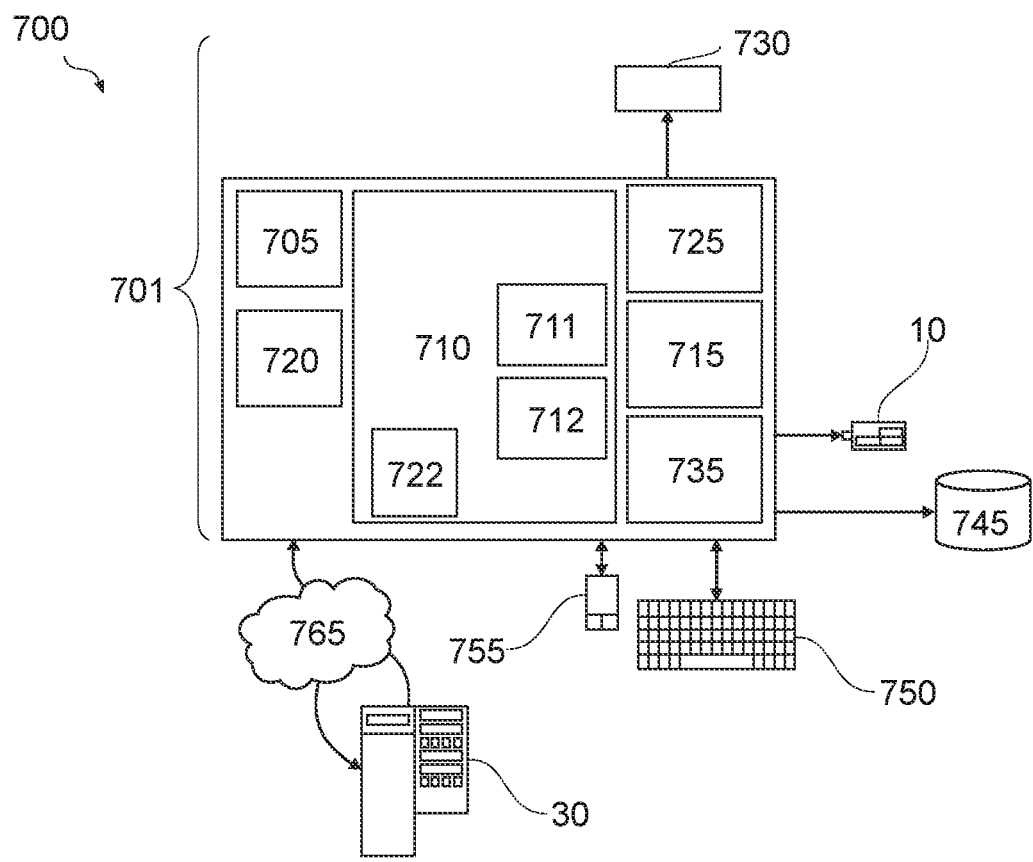
FIG. 7 represents a computerized system, suited for implementing one or more method steps in accordance with an embodiment of the present invention.

FIG. 7 represents a general computerized system 700 suited for implementing at least part of method steps in accordance with an embodiment of the present invention.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 712, 722 (including firmware 722), hardware (processor) 705, or a combination thereof. In exemplary embodiments, the methods described herein are implemented in software, as an executable program, and is executed by a special or general-purpose digital computer, such as a personal computer, workstation, minicomputer, or mainframe computer. The most general system 700 therefore includes a general-purpose computer 701.

In exemplary embodiments, in terms of hardware architecture, as shown in FIG. 7, the computer 701 includes a processor 705, memory (main memory) 710 coupled to a memory controller 715, and one or more input and/or output (I/O) devices (or peripherals) 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor-based microprocessor (in the form of a microchip or chip set), or generally any device for executing software instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in embodiments of this invention. In the example of FIG. 7, software in the memory 710 includes instructions 712, e.g., instructions to manage databases such as a database management system.

The software in memory 710 shall also typically include a suitable operating system (OS) 711. The OS 711 essentially controls the execution of other computer programs, such as possibly software 712 for implementing methods as described herein.

The methods described herein may be in the form of a source program 712, executable program 712 (object code), script, or any other entity comprising a set of instructions 712 to be performed. When a source program, then the program needs to be translated via a compiler, assembler, interpreter, or the like, which may or may not be included within the memory 710, so as to operate properly in connection with the OS 711. Furthermore, the methods can be written as an object-oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client and the like via a broadband connection. The network 765 transmits and receives data between the computer 701 and external systems 30, which can be involved to perform part, or all of the steps of the methods discussed herein. In exemplary embodiments, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) 722. The BIOS is a set of essential software routines that initialize and test hardware at start-up, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 7, the methods can be stored on any computer readable medium, such as storage 720, for use by or in connection with any computer related system or method. The storage 720 may comprise a disk storage such as HDD storage.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
providing, by one or more processors, at least two application algorithms for applying changes to a table in a target database system;
determining, by the one or more processors, for each application algorithm of the at least two application algorithms, a performance behavior of each application algorithm for sizes of changes that are applied to the table by the respective application algorithm, wherein the performance behavior is defined as a data structure comprising data points, wherein each data point includes a change size value and at least one performance parameter, wherein the change size value is a value reflecting a size of a requested change to the table, and wherein the at least one performance parameter is at least one of execution time and memory usage;
receiving, by the one or more processors, a data change request for applying a change to the table;
determining, by one or more processors, a size of the change to the table;
selecting, by the one or more processors, one of the at least two application algorithms that provides a best performance for the size based on the performance behavior of each application algorithm;

applying, by the one or more processors, the change to the table using the selected application algorithm that provides the best performance for the size;

evaluating, by the one or more processors, according to the performance behavior, a performance of the selected application algorithm by application of the change to the table; and updating, by the one or more processors, the performance behavior of the selected application algorithm by adding a new data point to the data structure that includes the performance of the selected application algorithm measured by the at least one performance parameter and the size of the change to the table.

2. The computer-implemented method of claim 1, further comprising:

repeating, by the one or more processors, the determining the size, the selecting, and the applying for each received data change request of the table; and dynamically updating, by the one or more processors, the performance behaviors of the table.

3. The computer-implemented method of claim 1, further comprising:

determining, by the one or more processors, the respective performance behaviors for each further table of the target database system, resulting in each table of the target database system being associated with respective performance behaviors; and repeating, by the one or more processors, the determining of the size, the selecting, and the applying for each received data change request of a specific table of the target database system using the performance behaviors associated with said specific table.

4. The computer-implemented method of claim 1, wherein the determining the performance behavior of each application algorithm comprises:

executing, by the one or more processors, the respective application algorithm a predefined number N of times for applying data changes to the table respectively, wherein each applied data change has a size;

evaluating, by the one or more processors, for each data change of the data changes, the at least one performance parameter indicative of a performance of the execution of the application algorithm; and providing, by the one or more processors, the data structure of N data points representing the performance behavior, wherein each data point is indicative of the at least one performance parameter and associated size of the data change.

5. The computer-implemented method of claim 4, further comprising:

wherein the predefined number N is smaller than a configurable maximum number of executions; and constructing, by the one or more processors, new data points in the data structure by using interpolation of the N data points.

6. The computer-implemented method of claim 1, wherein the size of the change comprises at least one of a number of records to be inserted, a number of records to be deleted, and a number of records to be updated.

7. The computer-implemented method of claim 1, wherein the selecting the application algorithm comprises:

determining, by the one or more processors, whether the performance of two application algorithms for the size are similar; and responsive to determining that the performance of two application algorithms for the size are similar, selecting, by the one or more processors, either one of the two application algorithms.

8. The computer-implemented method of claim 1, wherein the selected application algorithm is selected from the group consisting of a record bulk load-based application and an individual record load-based application.

9. The computer-implemented method of claim 1, further comprising:

providing, by the one or more processors, a source table associated with the table in a source database system, wherein the source database system and the target database system are configured to synchronize data between each other; and wherein the data change request is received in response to said data change being applied to the source table, thereby replicating the data change.

10. A computer program product comprising:

one or more computer readable storage media and program instructions collectively stored on the one or more computer readable storage media, the stored program instructions comprising:

program instructions to provide at least two application algorithms for applying changes to a table in a target database system;

program instructions to determine, for each application algorithm of the at least two application algorithms, a performance behavior of each application algorithm for sizes of changes that are applied to the table by the respective application algorithm, wherein the performance behavior is defined as a data structure comprising data points, wherein each data point includes a change size value and at least one performance parameter, wherein the change size value is a value reflecting a size of a requested change to the table, and wherein the at least one performance parameter is at least one of execution time and memory usage;

program instructions to receive a data change request for applying a change to the table;

program instructions to determine a size of the change to the table;

program instructions to select one of the at least two application algorithms that provides a best performance for the size based on the performance behavior of each application algorithm;

program instructions to apply the change to the table using the selected application algorithm that provides the best performance for the size;

program instructions to evaluate, according to the performance behavior, a performance of the selected application algorithm by application of the change to the table; and program instructions to update the performance behavior of the selected application algorithm by adding a new data point to the data structure that includes the performance of the selected application algorithm measured by the at least one performance parameter and the size of the change to the table.

11. The computer program product of claim 10, further comprising:

program instructions to repeat the program instructions to determine the size, the program instructions to select, and the program instructions to apply for each received data change request of the table; and program instructions to dynamically update the performance behaviors of the table.

12. The computer program product of claim 10, further comprising:
program instructions to determine the respective performance behaviors for each further table of the target database system, resulting in each table of the target database system being associated with respective performance behaviors; and
program instructions to repeat the program instructions to determine of the size, the program instructions to select, and the program instructions to apply for each received data change request of a specific table of the target database system using the performance behaviors associated with said specific table.

13. The computer program product of claim 10, wherein the program instructions to determine the performance behavior of each application algorithm comprise:
program instructions to execute the respective application algorithm a predefined number N of times for applying data changes to the table respectively, wherein each applied data change has a size;
program instructions to evaluate, for each data change of the data changes, the at least one performance parameter indicative of a performance of the execution of the application algorithm; and
program instructions to provide the data structure of N data points representing the performance behavior, wherein each data point is indicative of the at least one performance parameter and associated size of the data change.

14. A computer system comprising:
one or more computer processors;
one or more computer readable storage media;
program instructions collectively stored on the one or more computer readable storage media for execution by at least one of the one or more computer processors, the stored program instructions comprising:
program instructions to provide at least two application algorithms for applying changes to a table in a target database system;
program instructions to determine, for each application algorithm of the at least two application algorithms, a performance behavior of each application algorithm for sizes of changes that are applied to the table by the respective application algorithm, wherein the performance behavior is defined as a data structure comprising data points, wherein each data point includes a change size value and at least one performance parameter, wherein the change size value is a value reflecting a size of a requested change to the table, and wherein the at least one performance parameter is at least one of execution time and memory usage;
program instructions to receive a data change request for applying a change to the table;
program instructions to determine a size of the change to the table;
program instructions to select one of the at least two application algorithms that provides a best performance for the size based on the performance behavior of each application algorithm;
program instructions to apply the change to the table using the selected application algorithm that provides the best performance for the size;
program instructions to evaluate, according to the performance behavior, a performance of the selected application algorithm by application of the change to the table; and
program instructions to update the performance behavior of the selected application algorithm by adding a new data point to the data structure that includes the performance of the selected application algorithm measured by the at least one performance parameter and the size of the change to the table.

15. The computer system of claim 14, further comprising:
program instructions to repeat the program instructions to determine the size, the program instructions to select, and the program instructions to apply for each received data change request of the table; and
program instructions to dynamically update the performance behaviors of the table.

16. The computer system of claim 14, further comprising:
program instructions to determine the respective performance behaviors for each further table of the target database system, resulting in each table of the target database system being associated with respective performance behaviors; and
program instructions to repeat the program instructions to determine of the size, the program instructions to select, and the program instructions to apply for each received data change request of a specific table of the target database system using the performance behaviors associated with said specific table.

* * * * *